US011182067B2

(12) United States Patent
Wareing et al.

(10) Patent No.: US 11,182,067 B2
(45) Date of Patent: *Nov. 23, 2021

(54) INTERACTIVE DISPLAY OVERLAY SYSTEMS AND RELATED METHODS

(71) Applicant: Promethean Limited, Blackburn (GB)

(72) Inventors: Paul Wareing, Preston (GB); Chris Hinsley, Blackburn (GB)

(73) Assignee: Promethean Limited, Blackburn (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,380

(22) Filed: Jan. 17, 2020

(65) Prior Publication Data

US 2020/0150844 A1 May 14, 2020

Related U.S. Application Data

(63) Continuation of application No. 15/142,979, filed on Apr. 29, 2016, now Pat. No. 10,540,084.

(51) Int. Cl.
*G06F 3/0484* (2013.01)
*G06F 3/0488* (2013.01)
(Continued)

(52) U.S. Cl.
CPC ........ *G06F 3/0488* (2013.01); *G06F 3/04842* (2013.01); *G06F 3/04845* (2013.01);
(Continued)

(58) Field of Classification Search
CPC ...... G06F 3/0488; G06F 9/54; G06F 3/04883; G06F 3/04845; G06F 9/451; G06F 3/04842; G06F 9/546; G06F 2209/545
See application file for complete search history.

(56) References Cited

U.S. PATENT DOCUMENTS 5,581,670 A * 12/1996 Bier .................. G06F 3/0481
345/629
5,617,114 A 4/1997 Bier et al.
(Continued)

FOREIGN PATENT DOCUMENTS

CN    102576268    7/2012

OTHER PUBLICATIONS

Final Office Action, dated Jan. 11, 2019, from corresponding U.S. Appl. No. 15/142,979.
(Continued)

*Primary Examiner* — Jennifer N To
*Assistant Examiner* — Amy P Hoang
(74) *Attorney, Agent, or Firm* — Brient IP Law, LLC

(57) ABSTRACT

In various embodiments, an interactive display overlay system is configured to serve as a gatekeeper for detected inputs on an interactive display screen (e.g., such as an interactive whiteboard or touch screen display) that is displaying a transparent overlay layer over an underlying software application. In various embodiments, the system is configured to detect an input at a particular location on the interactive display screen and determine whether there is a widget at that particular location on the transparent overlay layer before passing the input on to the underlying software application. In particular embodiments, the system is configured to modify inputs detected at the overlay layer that are proximate to a widget to an edge of the widget prior to passing on modified input data to the underlying software application.

18 Claims, 11 Drawing Sheets

(51) Int. Cl.
   *G06F 9/451*      (2018.01)
   *G06F 9/54*       (2006.01)
(52) U.S. Cl.
   CPC .......... *G06F 3/04883* (2013.01); *G06F 9/451* (2018.02); *G06F 9/54* (2013.01); *G06F 9/546* (2013.01); *G06F 2209/545* (2013.01)

(56) References Cited

U.S. PATENT DOCUMENTS

| | | |
|---|---|---|
| 7,831,922 B2 | 11/2010 | Huapaya et al. |
| 8,059,099 B2 | 11/2011 | Lampell et al. |
| 8,487,889 B2 | 7/2013 | King |
| 9,076,261 B2 | 7/2015 | Rhoades et al. |
| 9,335,887 B2 | 5/2016 | Kwak et al. |
| 2012/0313865 A1* | 12/2012 | Pearce ................ G06F 3/0416 345/173 |
| 2014/0033098 A1 | 1/2014 | Uota |
| 2016/0232144 A1* | 8/2016 | Zhou .................... G06F 16/986 |

OTHER PUBLICATIONS

International Search Report, dated Jul. 25, 2017, from corresponding International Application No. PCT/IB2017/052450.
Notice of Allowance, dated Sep. 17, 2019, from corresponding U.S. Appl. No. 15/142,979.
Office Action, dated Mar. 8, 2018, from corresponding U.S. Appl. No. 15/142,979.
Written Opinion of the International Searching Authority, dated Jul. 25, 2017, from corresponding International Application No. PCT/IB2017/052450.

* cited by examiner

INTERACTIVE DISPLAY OVERLAY SYSTEMS AND RELATED METHODS

CROSS REFERENCE TO RELATED APPLICATIONS

This application is a continuation of U.S. patent application Ser. No. 15/142,979, filed Apr. 29, 2016, the entire disclosure of which is hereby incorporated by reference in its entirety.

BACKGROUND

Drawing and drafting in computing applications can be cumbersome and difficult, particularly for those inexperienced with drawing or drafting programs. Replicating a pen-and-paper drawing experience may be desirous to some users of computer drawing applications. Accordingly, there is a need for systems and methods that address these difficulties and desires in addition to other deficiencies found in prior art systems.

SUMMARY

An interactive display system, according to various embodiments, comprises one or more processors and an interactive display device operatively coupled to the one or more processors. In particular embodiments, the interactive display system is configured for: (1) providing an interactive overlay application for use with the interactive display device, the interactive overlay application comprising one or more widgets and being configured to run with one or more underlying software applications in the background on the interactive display system; (2) detecting an input on the interactive display device; (3) determining input data related to the input, the input data comprising at least a location of the input; transmitting a first packet comprising the input data to the interactive overlay application, the first packet comprising a private packet; (4) determining, using the interactive overlay application, whether the location of the input comprises the one or more widgets on the interactive display device; (a) in response to determining that the location of the input comprises one widget of the one or more widgets, modifying the one widget based on the input data; (b) in response to determining that the location of the input does not comprise the one or more widgets: (i) determining, by the interactive overlay application, whether the location of the input is within a particular distance of the one or more widgets and in response to determining that the location of the input is within the particular distance of one of the one or more widgets and the location of the input does not comprise the one widget: (1) modifying the input location to a modified input location that corresponds to an edge of the one widget adjacent the input location; (2) modifying the first packet to a third packet comprising the modified input location, the third packet comprising a standard packet; and (3) transmitting the third packet to the one or more underlying software applications; and (ii) in response to determining that the location of the input is not within the particular distance of the one widget and the location of the input does not comprise the one widget: (1) modifying the first packet to a second packet, the second packet comprising a standard packet; and transmitting the second packet to the one or more underlying software applications.

An interactive display system, according to various embodiments, comprises one or more processors; and an interactive display device operatively coupled to the one or more processors. In particular embodiments, the interactive display system is configured for: (1) providing an interactive overlay application for use with the interactive display device, the interactive overlay application comprising one or more widgets and being configured to run with one or more underlying software applications in the background on the interactive display system; (2) detecting an input on the interactive display device; (3) determining input data related to the input, the input data comprising at least a location of the input; (4) transmitting the input data to the interactive overlay application according to a first protocol; determining, using the interactive overlay application, whether the location of the input comprises the one or more widgets on the interactive display device; (5) in response to determining that the location of the input comprises the one or more widgets, modifying the one or more widgets based on the input data; and (6) in response to determining that the location of the input does not comprise the one or more widgets: (a) modifying the input data based on a second protocol to formatted input data; and (b) transmitting the formatted input data to the one or more underlying software applications.

A system for providing virtual tools on a touch enabled display, according to various embodiments, comprises at least on processor and a touch enabled display operatively coupled to the at least one processor. In particular embodiments, the touch enabled display is adapted to: (1) detect contact points at a surface of the touch enabled display; (2) send data related to one or more contact points: (a) in a first mode to one or more applications running on the at least one processor; and (b) in a second mode to a virtual tool application running on the at least one processor in the background. In various embodiments, the at least one processor is configured for: (1) receiving an input by a user that activates a virtual tool application; (2) at least partially in response to receiving the input, running the virtual tool application in the background; and (3) at least partially in response to running the virtual tool application, changing the touch enabled display from the first mode to the second mode such that data related to the one or more contact points are sent to the virtual tool application.

BRIEF DESCRIPTION OF THE DRAWINGS

Various embodiments of an interactive display overlay system are described below. In the course of this description, reference will be made to the accompanying drawings, which are not necessarily drawn to scale, and wherein.

DETAILED DESCRIPTION

Figure 1:
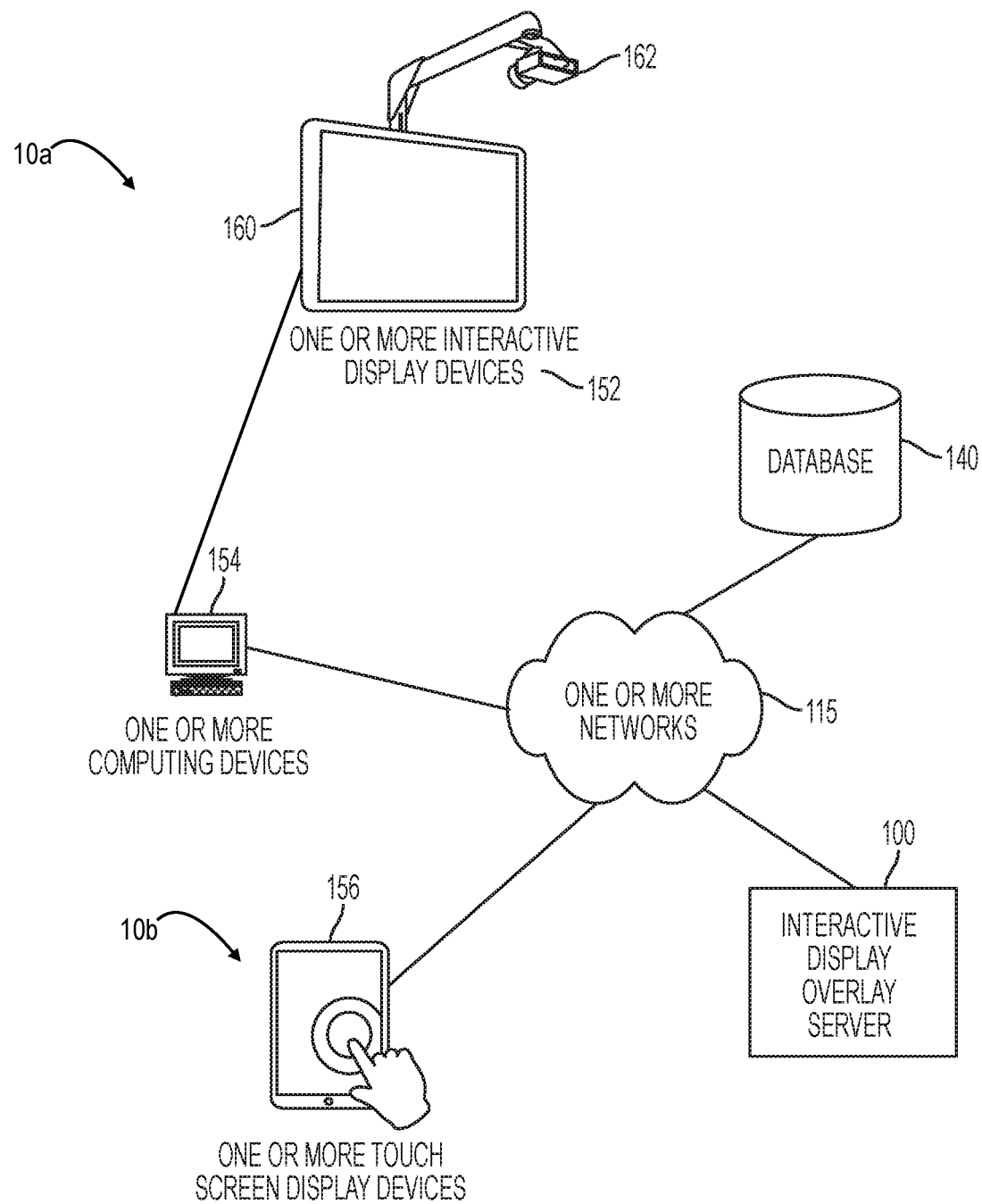
FIG. 1 is a block diagram of an interactive display overlay system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, an interactive display overlay system is configured to serve as a gatekeeper for detected inputs on an interactive display screen (e.g., such as an interactive whiteboard or touch screen display) that is displaying a transparent overlay layer over an underlying software application. In various embodiments, the system is configured to detect an input at a particular location on the interactive display screen and determine whether there is a widget at that particular location on the transparent overlay layer before passing the input on to the underlying software application.

The system may, for example: (1) detect an input at a particular location on the interactive display screen; (2) transmit data related to the input location to an interactive overlay application (e.g., transmit a private data packet to the interactive overlay application); (3) determine, using the interactive overlay application, whether the input location comprises a widget on the transparent overlay layer; (4) modify (e.g., transform) the data related to the input location (e.g., modify the private data packet to a standard data packet) in response to determining that the input location does not comprise a widget on the transparent overlay layer; and (5) transmit the data related to the input location to the underlying software application. In various embodiments, the system may determine whether a location of the detected input is within a particular distance of a widget on the transparent overlay layer but does not comprise the widget and, in response to determining that the location of the detected input is within the particular distance of the widget, but does not comprise the widget, modifying the detected input location to a modified location that corresponds to an edge of the widget adjacent the location of the detected input (e.g., the actual input location). In such embodiments, this may enable users to utilize widgets and other tools to draw more precisely in particular software applications on devices where precision may be difficult (e.g., such as when drawings with a finger, an electronic pen, etc. using a touchscreen display).

In particular embodiments, the interactive display overlay system is configured to provide one or more widgets as part of a selectively interactive overlay. In particular embodiments, the interactive display overlay system comprises an interactive touch screen display such as, for example, an interactive touch screen display panel, an interactive whiteboard, an ACTIVWALL™ touch display manufactured by Promethean, Ltd of Blackburn, England, etc. In various embodiments, the interactive touch screen display may be configured to run one or more software applications on one or more suitable operating systems in addition to a selectively interactive overlay layer running in the background (e.g., via an interactive overlay application) which may include, for example, one or more widgets that the interactive display screen is configured to display as an overlay to one or more software applications running on the interactive display.

In various embodiments, the selectively interactive overlay layer is substantially transparent (e.g., transparent) such that a user viewing the interactive touch screen display can view at least a portion of the one or more software applications (e.g., running on the one or more suitable operating systems) through the selectively interactive overlay layer. Said another way, when the selectively interactive overlay layer is running, the system changes from a first mode in which input received on the interactive touch display is transmitted to the one or more software applications running on the system into a second mode where touch input received on the interactive touch display is sent to the interactive overlay application without affecting the focus of the one or more applications. In particular embodiments, the selectively interactive overlay layer comprises one or more indicia configured to enable a user to select a particular one of the one or more widgets for use within the interactive overlay layer. In various embodiments, the interactive display overlay system is configured to enable a user to: (1) manipulate or otherwise interact with the one or more widgets that make up the interactive overlay layer without affecting the focus of the one or more software applications; (2) manipulate or otherwise interact with one or more underlying software applications; and (3) use the one or more widgets to interact with and/or manipulate the one or more underlying software applications.

In various embodiments, the interactive overlay layer may serve as a filter configured to distinguish among: (1) an input intended to interact with the one or more widgets; (2) an input intended to interact with the underlying software application or operating system; and/or (3) an input intended to interact with the underlying software application or operating system using the one or more widgets (e.g., drawing a curve using the widget in the one or more software applications). The input may include, for example, a touch input (e.g., via a touch screen or touch pad), a pointer input (e.g., such as with a mouse or other input device), an input from an electronic pen or other stylus device, etc. In various embodiments, the system is configured to determine a location of the input on the interactive display and a type of input (e.g., touch, pointer, stylus, etc.).

In various embodiments, the system is configured to: (1) intercept an input at the interactive overlay layer; (2) determine whether the input was intended for the interactive overlay layer and modify the interactive overlay layer according to the input; and (3) in response to determining that the input was not intended for the interactive overlay layer, transmit (e.g., send) the input data to the underlying software application. In particular embodiments, the system is then configured to modify the underlying software application based on the input. In still other embodiments, the interactive overlay layer is configured to interpret inputs as a private event and the underlying software application is configured to interpret data as a native event. In such embodiments, the system is configured to: (1) interpret input data as a private event at the interactive overlay layer; (2) determine, based on the input data, whether the input was intended for the interactive overlay layer; and (3) in response to determining that the input was not intended for the interactive overlay layer, transmit (e.g., send) the input data to the underlying software application as a native event.

In various embodiments, the one or more widgets may include one or more suitable drafting tools such as, for example, a compass, a ruler or other suitable straight edge, a protractor, a drafting T-square, a drafting triangle, a drafting scale, a French curve ruler, a ship curve tool, an arc ruler, or any other suitable drafting tool, etc. In particular embodiments, the interactive display system is configured to enable a user of the interactive display system to manipulate the one or more widgets using one or more suitable inputs. In particular embodiments, the interactive display system may, for example, resize a particular one of the one or more widgets, adjust an orientation or position of a particular one of the one or more widgets relative to an underlying software application running on the interactive display, or take any other suitable action in response to a particular input from a user of the interactive display system. The system may, for example, resize a particular widget in response to: (1) a user placing a first finger on a first portion of the interactive display that is displaying the widget (e.g., adjacent a first portion of the widget), (2) the user placing a second finger on a second portion of the interactive display that is displaying the widget (e.g., adjacent a second portion of the widget); and (3) the user moving their first finger and their second finger away from one another while maintaining contact between their first and second fingers and the interactive display. In such an example, the system may, for example, resize the widget based on the distance that the user moved their first finger away from their second finger. In particular embodiments, the system is configured to enable the user to interact with or otherwise manipulate the one or more widgets by, for example: (1) resizing the one or more widgets; (2) moving the one or more widgets within the interactive overlay layer; (3) adjust an orientation of the one or more widgets relative to the interactive overlay layer (e.g., rotating the widget); and/or (4) manipulate, move, or otherwise adjust the one or more widgets in any other suitable manner.

In particular embodiments, the system is configured to detect an input that is within a particular distance of a widget on the overlay layer but that does not comprise the widget (e.g., the touch is not on the widget), modify the input location to a location that corresponds to an edge of the widget adjacent the actual input location, modify data related to the input including the modified input location to a second data type, and transmit the modified data to an underlying software application. As is described more fully below, input location modification by the system may, for example, enable users to use widgets to interact with underlying software applications by using one or more edges of the widget.

Exemplary Technical Platforms

As will be appreciated by one skilled in the relevant field, the present invention may be, for example, embodied as a computer system, a method (e.g., a computer-implemented method), or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium (e.g., a nontransitory computer-readable medium) having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods (e.g., computer-implemented methods), apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of an interactive display overlay system 10a, 10b according to particular embodiments. As may be understood from this figure, an interactive display overlay system 10a, according to a first embodiment, comprises: (1) one or more interactive display devices 152 that comprise an interactive whiteboard 160 and an interactive projector 162 (e.g., such as a Promethean BrightLink multimedia projector); and (2) one or more computing devices 154 operatively coupled to the one or more interactive display devices.

In various embodiments, the interactive projector 162 is configured to display (e.g., on the interactive whiteboard 160) one or more images from the one or more computing devices 154, which the interactive projector 162 is coupled to. In particular embodiments, the interactive projector 162 is configured to project the one or more images onto any suitable surface and further configured to act as an interactive display for the one or more connected computing devices. In various embodiments, the interactive display overlay system 10a further comprises one or more imaging devices (e.g., one or more cameras) used to detect a location of an input on the interactive whiteboard 160 based on an infrared grid projected on the interactive whiteboard 160.

In various embodiments, the interactive display overlay system 10a may utilize any suitable interactive whiteboard 160, such as, for example: (1) an infrared scan (e.g., IR touch) whiteboard, in which the interactive display overlay system 10a triangulates a location of an input based on interference of an input device (e.g., a marker/pen/finger) with infrared light at a surface of the interactive whiteboard 160; (2) a resistive touch-based interactive whiteboard, in which the interactive display overlay system 10a determines a touch point location electronically in response to a membrane stretched over a surface of the interactive whiteboard 160 deforming under pressure to make contact with a conducting back plate; (3) an electromagnetic pen-based interactive whiteboard, which may include, for example, an array of wires embedded behind a solid surface of the interactive whiteboard 160 that interacts with a coil in an input device such as a pen to determine a location of input on the board; and/or (4) any other suitable interactive whiteboard 160. In various embodiments, the interactive whiteboard 160 and/or the interactive projector 162 may serve as an input device for the interactive display overlay system 10a.

In particular embodiments, the interactive projector 162 is configured to detect input via the projected one or more images, for example, via an interactive pointer pen or other suitable input device (e.g., such as a user or users' finger or fingers), etc. In particular embodiments, the interactive projector 162 (and/or the interactive whiteboard 160) is configured to detect a plurality of simultaneous inputs (e.g., from a plurality of users). In various embodiments, the interactive projector 162 (and/or the interactive whiteboard 160) is configured to enable a user to interact with the one or more projected images as the user would interact with any other computing display device (e.g., by drawing on the one or more projected images), etc. In still other embodiments, the interactive projector 162 includes one or more computing components (e.g., one or more processors and memory) such that the interactive projector 162 embodies a stand-alone computing device.

In various other embodiments of an interactive display overlay system 10b, the interactive display overlay system 10b comprises one or more touch screen display devices 156, which may, for example, comprise any suitable touch screen device configured to receive input via contact on the display device (e.g., via a user's finger or other body part, via a stylus or other pen-like device, etc.). For example, in various embodiments, the one or more touch screen display devices 156 comprise one or more resistive touch screen displays (e.g., one or more 5-wire resistive touch screen displays), one or more surface capacitive touch screen displays, one or more projected capacitive touch screen displays, one or more surface acoustic wave touch screen displays, one or more infrared touch screen displays, or any other suitable touch screen display. In particular embodiments, the one or more touch screen display devices 156 comprise one or more processors and memory. In such embodiments, the one or more touch screen display devices 156 may comprise stand-alone computing devices such as handheld computing device (e.g., tablet computers or smartphones), wall mounted display devices (e.g., such as touch-enabled computerized LED and/or LCD displays), etc.

In particular embodiments, the interactive display overlay system 10a, 10b is configured to run interactive overlay software, such as the interactive overlay software described herein, locally on a device on which a user is utilizing the interactive overlay display software. For example, in one embodiment of an interactive display overlay system 10a, one or more computing devices 154 may store an interactive overlay software application on local memory associated with the one or more computing devices 154, execute software instructions from the interactive overlay software application using one or more local processors associated with the one or more computing devices 154, detect inputs locally using the one or more interactive display devices 152, etc. In still other embodiments of the interactive display overlay system 10b, one or more touch screen display devices 156 may store an interactive overlay software application on local memory associated with the one or more touch screen display devices 156, execute software instructions from the interactive overlay software application using one or more local processors associated with the one or more touch screen display devices 156, detect inputs via a touch screen enabled display associated with the one or more touch screen display devices 156, etc.

In various other embodiments, an interactive display overlay system 10a, 10b may utilize one or more suitable cloud computing techniques in order to execute overlay software, underlying software, store and access one or more documents, etc. In such embodiments, one or more computer networks 115 may facilitate communication between an interactive display overlay server 100, a database 140, and the interactive display overlay system 10a, 10b. For example, the one or more networks 115 may facilitate communication between the one or more computing devices 154 or the one or more touch screen display devices 156 and the interactive display overlay server 100 in order to execute an interactive overlay software application or a suitable underling software application at least partially stored on the interactive display overlay server 100. The one or more networks 115 may further facilitate access between the one or more computing devices 154 or the one or more touch screen display devices 156 and a suitable document stored in the remote database 140 (e.g., one or more remote databases). The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between interactive display overlay server 100, the database 140, and the one or more computing devices 154, 156 may be, for example, implemented via a Local Area Network (LAN) or via the Internet.

Figure 2:
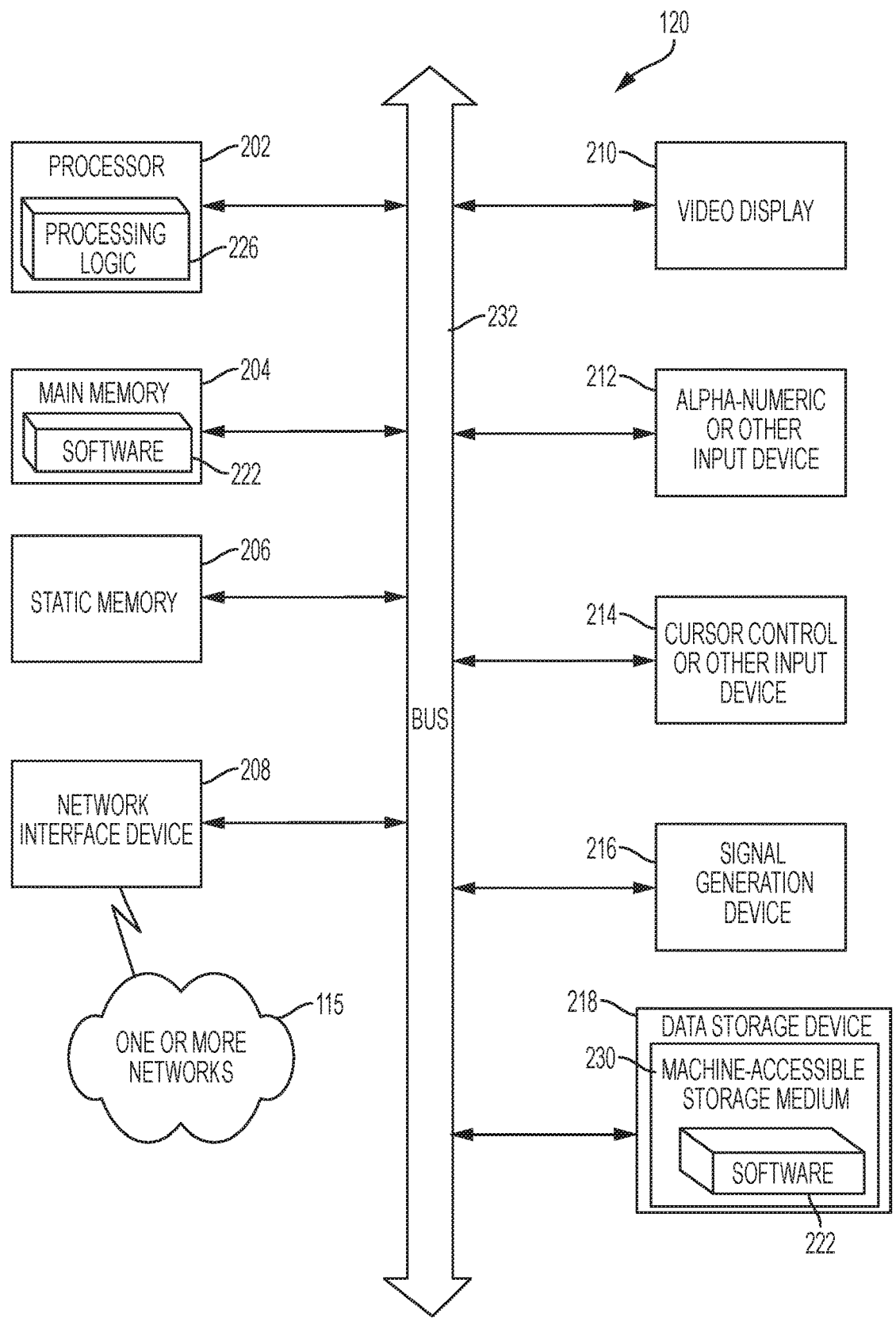
FIG. 2 is a schematic diagram of a computer, such as the interactive display overlay server of FIG. 1, that is suitable for use in various embodiments.

FIG. 2 illustrates a diagrammatic representation of a computer architecture 120 that can be used within the interactive display overlay system 10a, 10b, for example, as a client computer (e.g., the one or more computing devices 154, 156 shown in FIG. 1), or as a server computer (e.g., interactive display overlay server 100 shown in FIG. 1). In particular embodiments, the computer 120 may be suitable for use as a computer within the context of the interactive display overlay system 10a, 10b that is configured to receive input from an interactive display device (e.g., such as a touch screen display, interactive whiteboard 160, etc.), determine whether the input is intended for an overlay, and in response to determining that the input is not intended for the overlay, passing the input through to an underlying software program.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The Computer 120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD), a projector, a cathode ray tube (CRT), any suitable display described herein, or any other suitable display), an alphanumeric input device 212 (e.g., a keyboard), a cursor control device 214 (e.g., a mouse, stylus, etc.), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 120—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of an interactive display overlay system may be implemented in the context of any suitable interactive display device. For example, particular embodiments may be implemented on an interactive display device, touch screen display device, or any other suitable computing device. Various aspects of the system's functionality may be executed by certain system modules, including an Input Determination and Interpretation Module 300 or Input Coordinate Modification Module 400. These modules are discussed in greater detail below.

Input Determination and Interpretation Module

Figure 3:
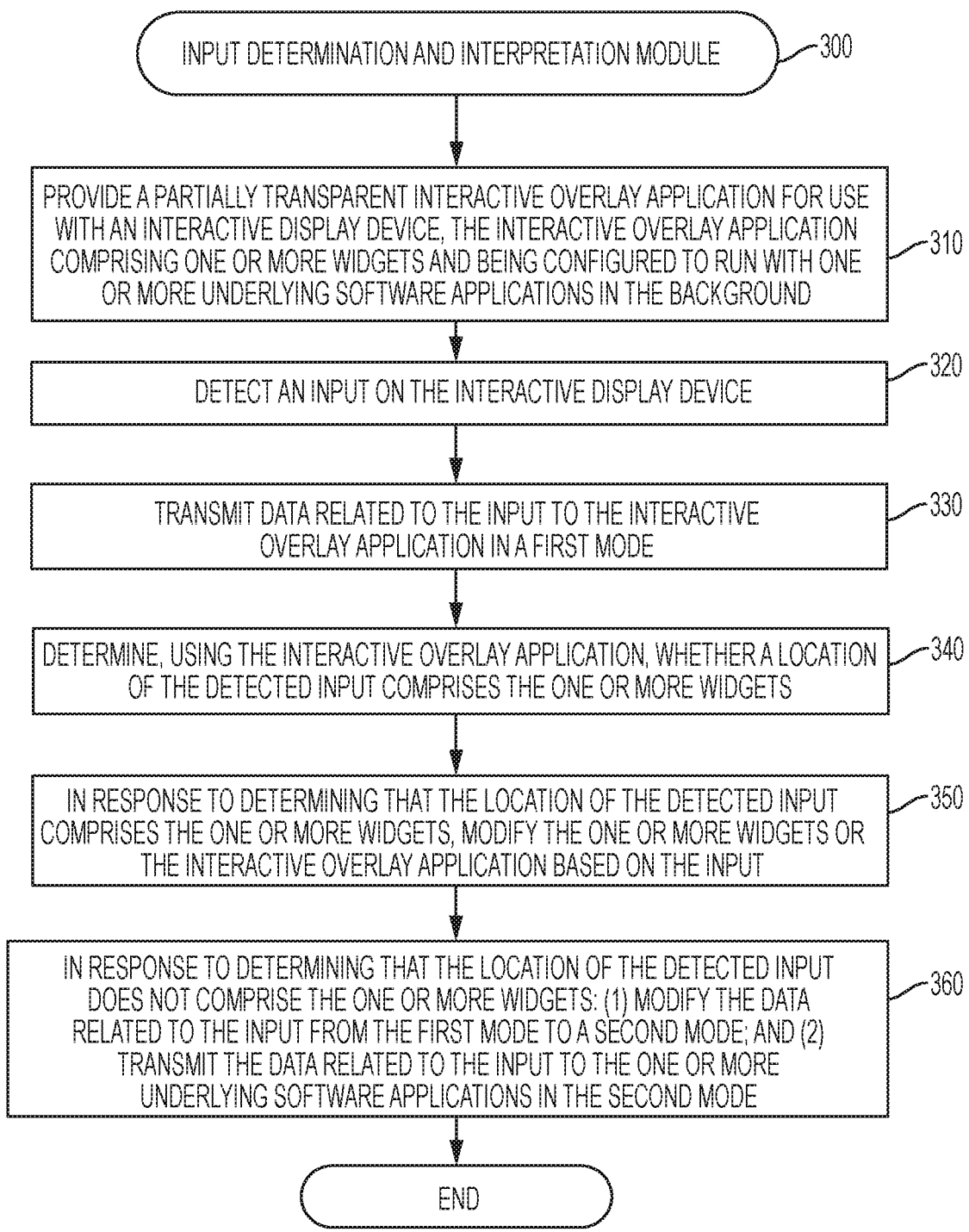
FIG. 3 depicts a flow chart that generally illustrates various steps executed by an input determination and interpretation module that, for example, may be executed by the one or more touch screen displays or one or more interactive displays of FIG. 1.

FIG. 3 is a flow chart of operations performed by an exemplary Input Determination and Interpretation Module 300. In particular embodiments, the Input Determination and Interpretation Module 300 may serve as a gatekeeper for detected inputs on an interactive display device between an underlying software application and an interactive overlay application that is projected over the underlying software application on the one or more interactive display devices 152, 156.

When executing the Input Determination and Interpretation Module 300, the system begins, at Step 310, by providing a partially transparent interactive overlay application for use in the interactive display overlay system 10a, 10b, the interactive overlay application comprising one or more widgets and being configured to run with one or more underlying software applications in the background. In various embodiments, the interactive display device may include any suitable display device, such as any display device disclosed herein.

In various embodiments, the interactive display device is configured to display the one or more underlying software applications on a display screen associated with the interactive display device while simultaneously displaying the partially transparent interactive overlay application over at least a portion of the display screen. For example, as may be understood by one skilled in the art, the system may display an underlying software application (e.g., a word processor, internet browsing application, drawing application, photo-editing application, etc.) running on a suitable operating system, while displaying the interactive overlay application over the underlying software application. In various embodiments, the interactive overlay application may include one or more user-selectable indicia which may access various functionality associated with the interactive overlay application (e.g., accessing one or more widgets, modifying one or more settings associated with the interactive overlay application, etc.).

In various embodiments, the interactive overlay application operates to filter input data so that input data meant for the interactive overlay application is acted upon by the interactive overlay application without having any effect on the underlying one or more software applications and information meant for the one or more software applications is sent back to the interactive display with instructions to forward the input data to the one or more underlying software applications. In this way, input data meant for the interactive overlay application will not affect or inadvertently change the focus of the one or more software applications running under the interactive overlay application.

Thus, the interactive overlay application, when running, functions as an input data filter, allowing particular data meant for the interactive overlay application to be used by this application while forwarding all other data back to the interactive display device with instructions to be forwarded to the one or more software applications.

In particular embodiments, the one or more widgets comprise any suitable widget such as, for example, a compass, a ruler or other suitable straight edge, a protractor, a drafting T-square, a drafting triangle, a drafting scale, a French curve ruler, a ship curve tool, an arc ruler, or any other suitable widget, drafting tool, etc. In particular embodiments, the one or more widgets may be any suitable widget which may, for example, be useful for the purposes of interacting with the one or more underlying software applications. For example, as will be described in more detail below, the one or more widgets may include a suitable drawing tool such as a protractor or compass, which the system may use to modify a user's input to follow a curve of the protractor or to draw a circle using the compass. As will be understood by one skilled in the art, the system may be configured to use (e.g., use) other suitable tools to modify detected input points to follow or otherwise trace an edge of the one or more widgets in the one or more underlying software applications.

Returning to Step 320, the system continues by detecting an input on the interactive display device. In various embodiments, the system may detect an input via physical contact from a user of the interactive display device (e.g., a touch input or a pen input), detect input via a suitable input device (such as a mouse or other pointer device), or in any other suitable manner. In various embodiments, the system detects a type of input and a location of an input when detecting an input. For example, when detecting an input on the interactive display device, the system may determine that the input was a touch input and that the input occurred at a particular location (e.g., coordinate location) on the interactive display device. In various embodiments, the detected input comprises an "x" position and a "y" position (e.g., an absolute x position and an absolute y position).

In various embodiments, the detected input may include a multi-touch input. In other embodiments, the system may determine, for each input, additional input data such as, for example, an input button (e.g., left mouse button, right mouse button, forward button, etc.). In particular embodiments, the system may be configured to detect a plurality of simultaneous inputs. In various embodiments, an input protocol utilized by the interactive display device may determine what data the system determines at the detection of an input by the interactive display device. In particular inputs, detecting the input may activate the interactive overlay application. In various embodiments, the interactive display overlay system 10a, 10b detects an input in response to receiving an indication of an input from a suitable input device operatively coupled to the system. For example, the system may receive an indication from any suitable input device described herein such as, for example, a touch screen display, an interactive whiteboard 160, etc.

The system continues, at Step 330, by transmitting data related to the input to the interactive overlay application when in a first mode. In various embodiments, the data related to the input may include, for example, a location (e.g., coordinate location) and type of the input. In particular embodiments, when the system is in the first mode, the interactive overlay application is running and the interactive display device transmits input data using a private protocol, which may, for example, comprise a data type that the interactive overlay application is configured to interpret but that the underlying software application is not configured to interpret. In various embodiments, the interactive overlay application is configured to instruct the interactive display device to report detected inputs by transmitting packets according to the first mode (e.g., according to a first protocol) where the first mode is a mode other than a standard mode traditionally used by the one or more underlying software applications (e.g., or an underlying operating system) to detect and interpret inputs (e.g., such as the HID protocol and/or related protocols).

In particular embodiments, the first mode (e.g., the first protocol) comprises any suitable protocol that the interactive overlay application can use to determine the input data (e.g., such as a location of the input on the interactive display device and the type of input). In various embodiments, transmitting the data in the first mode enables the interactive overlay application to act as a gatekeeper (e.g., a screen) for inputs detected by the interactive display device before those detected inputs are transmitted to the one or more underlying software applications (e.g., because the one or more underlying software applications or operating systems are not configured to interpret the data in the first mode).

Continuing to Step 340, the system determines, using the interactive overlay application, whether a location of the detected input comprises the one or more widgets. In various embodiments, determining whether the location of the detected input comprises the one or more widgets comprises determining whether the interactive display device is displaying a portion of the one or more widgets at the input location. For example, the system may be checking whether the detected input was on the one or more widgets or away from the one or more widgets. In various embodiments, the system makes the determination by comparing a location of the input (e.g., a coordinate location such as an 'x,y' location) with a location of the one or more widgets that may make up the interactive overlay application.

Returning to Step 350, the system, in response to determining that the location of the detected input comprises the one or more widgets, modifies the one or more widgets or the interactive display application based on the input. In various embodiments, modifying the one or more widgets based on the input comprises performing the type of input on the one or more widgets at the location of the input. Modifying the one or more widgets may include, for example: (1) moving the one or more widgets; (2) resizing the one or more widgets; (3) rotating the one or more widgets; or (4) adjusting a size, shape, orientation, etc. of the one or more widgets to any location. For example, the system may, in a particular embodiment, interpret a detected input that occurs in the same location as the one or more widgets as follows, and modify the one or more widgets accordingly: (1) single finger tap: click or select the one or more widgets at the location; (2) single finger motion: move the selected one or more widgets; (3) two finger motion with both fingers moving towards each other or apart in different directions: pan/scale/rotate, etc. the selected one or more widgets based on the motion of the two fingers, and/or (4) make any other suitable modification based on the input.

In various embodiments, in response to determining that the location of the detected input comprises the one or more widgets, the system is configured to not transmit any input data to the underlying one or more software applications. In such embodiments, an underlying software application would not receive any input following an input detected on a widget (e.g., or other indicia) on the interactive overlay application. For example, for the underlying software application, in various embodiments, it would be as if no input occurred at all if a detected input is determined by the system to have occurred on a widget or other indicia that the interactive overlay application comprises.

Returning to Step 360, the system, in response to determining that the location of the detected input does not comprise the one or more widgets: (1) modifies the data related to the input from the first mode to a second mode; and (2) transmits the data related to the input to the one or more underling software applications in the second mode. In particular embodiments, the standard protocol is a mode traditionally used by the one or more underlying software applications (e.g., or an underlying operating system) to detect and interpret inputs (e.g., such as the HID protocol and/or related protocols). In various embodiments, the system modifies the data related to the input from the first mode to the second mode by modifying the data from the first mode to a second mode based on the standard protocol.

In various embodiments, the system transmits the data in the second mode via any suitable packet (e.g., a standard packet). In particular embodiments, when the system transmits the data related to the input to the one or more underlying software applications in the second mode, the one or more underlying software applications "see" and interpret the input as though the system never determined whether the input occurred at a location intended for the interactive overlay application (e.g., the underlying system receives and responds to the input as it would a standard input directly from an input device). For example, in response to receiving the transmitted data related to the input in the second mode, the one or more underlying software applications may, in various embodiments, modify the one or more underlying software applications based on the input (e.g., modify the one or more underlying applications based on the type of input at the location of the input). In still other embodiments, the system may transmit the data related to the input in the same format in which it received the data at the interactive overlay layer.

Although the above module is described in the context of an input, it should be understood be one skilled in the art that various embodiments of the system may be configured to detect simultaneous inputs (e.g., a plurality of substantially instantaneous inputs (e.g., instantaneous inputs)). It should be further understood that in various embodiments, the system is configured to substantially continuously detect an input (e.g., or inputs) and process each particular detected input according to the module described herein. Although the module is described above as comprising various steps, it should be understood that particular other embodiments of such a module may incorporate additional steps, omit certain described steps, perform the described steps in an order other than in which they are presented, or otherwise modify the module in any other suitable manner.

Input Coordinate Modification Module

Figure 4:
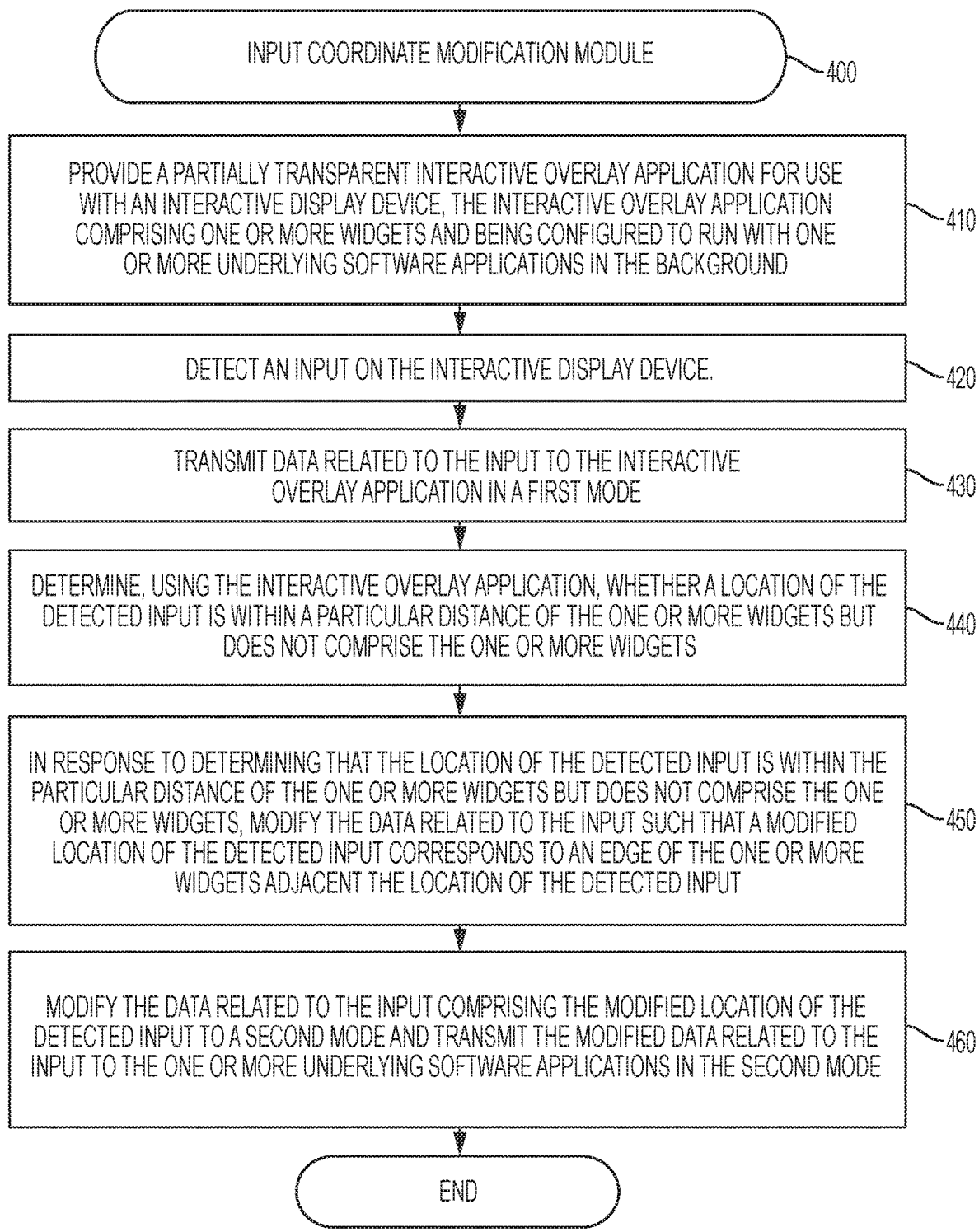
FIG. 4 depicts a flow chart that generally illustrates various steps executed by an Input Coordinate Modification Module that, for example, may be executed by the one or more interactive displays or one or more touch screen displays of FIG. 1.

FIG. 4 is a flow chart of operations performed by an exemplary Input Coordinate Modification Module 400. In particular embodiments, the exemplary Input Coordinate Modification Module 400 may modify inputs detected within a particular distance of one or more widgets running as part of an interactive overlay application to correspond to an edge location of the one or more widgets, and pass the modified input through to an underlying software application in a format interpretable by the underlying software application (e.g., a mode other than the mode in which the input was initially received by the overlay application).

When executing the exemplary Input Coordinate Modification Module 400, the system begins, at Step 410, by providing a partially transparent interactive overlay application for use with in interactive display device, the interactive overlay application comprising one or more widgets (e.g., a widget) and being configured to run with one or more underlying software applications (e.g., one or more operating systems, one or more drawing applications, etc.) in the background. In various embodiments, the interactive display device may include any suitable display device, such as any display device disclosed herein.

In various embodiments, the interactive display device is configured to display the one or more underlying software applications on a display screen associated with the interactive display device while simultaneously displaying the partially transparent interactive overlay application over at least a portion of the display screen. In other embodiments, the interactive display device may project the one or more underlying software applications and the overlay application on a suitable projection screen. For example, as may be understood by one skilled in the art, the system may display an underlying software application (e.g., a word processor, internet browsing application, drawing application, photo-editing application, etc.) running on a suitable operating system, while displaying the interactive overlay application over the underlying software application. In various embodiments, the interactive overlay application may include one or more user-selectable indicia which may access various functionality associated with the interactive overlay application (e.g., accessing one or more widgets, modifying one or more setting associated with the interactive overlay application, etc.).

In particular embodiments, the one or more widgets comprise any suitable widget such as, for example, a compass, a ruler or other suitable straight edge, a protractor, a drafting T-square, a drafting triangle (e.g., set square), a drafting scale, a French curve ruler, a ship curve tool, an arc ruler, or any other suitable widget, drafting tool, etc. In particular embodiments, the one or more widgets may be any suitable widget which may, for example, be useful for the purposes of interacting with the one or more underlying software applications. For example, as will be described in more detail below, the one or more widgets may include a suitable drawing tool such as a protractor, which the system may use to modify a user's input to follow a curve of the protractor. As will be understood by one skilled in the art, the system may be configured to use (e.g., use) other suitable tools to modify detected input points to follow or otherwise trace an edge of the one or more widgets in the one or more underlying software applications.

Returning to Step 420, the system continues by detecting an input on the interactive display device. In various embodiments, the system may detect an input via physical contact from a user of the interactive display device (e.g., a touch input or a pen input), detect input via a suitable input device (such as a mouse or other pointer device), or in any other suitable manner. In various embodiments, the system detects a type of input and a location of an input when detecting an input. For example, when detecting an input on the interactive display device, the system may determine that the input was a touch input and that the input occurred at a particular location (e.g., coordinate location) on the interactive display device. In various embodiments, the detected input comprises an "x" position and a "y" position (e.g., an absolute x position and an absolute y position).

In various embodiments, the detected input may include a multi-touch input. In other embodiments, the system may determine, for each input, additional input data such as, for example, an input button (e.g., left mouse button, right mouse button, forward button, etc.). In particular embodiments, the system may be configured to detect a plurality of simultaneous inputs. In various embodiments, an input protocol utilized by the interactive display device may determine what data the system determines at the detection of an input by the interactive display device.

In particular embodiments, the system is configured to detect the input using the interactive overlay application. In such embodiments, the interactive overlay application may serve as a gatekeeper for any inputs into the system (e.g., via the interactive display device).

The system continues, at Step 430, by transmitting data related to the input to the interactive overlay application in a first mode. In various embodiments, the data related to the input may include, for example, a location (e.g., coordinate location) and type of the input. In particular embodiments, the first mode comprises a private protocol which may, for example, comprise a data type that the interactive overlay application is configured for interpreting but that the underlying software application is not configured to interpret. In various embodiments, the interactive overlay application is configured to instruct the interactive display device to report detected inputs by transmitting packets according to the first mode (e.g., according to a first protocol) where the first mode is a mode other than a standard mode traditionally used by the one or more underlying software applications (e.g., or an underlying operating system) to detect and interpret inputs (e.g., such as the HID protocol and/or related protocols).

In particular embodiments, the first mode (e.g., the first protocol) comprises any suitable protocol that the interactive overlay application can use to determine the input data (e.g., such as a location of the input on the interactive display device). In various embodiments, transmitting the data in the first mode enables the interactive overlay application to act as a gatekeeper (e.g., a screen) for inputs detected by the interactive display device before those detected inputs are transmitted to the one or more underlying software applications (e.g., because the one or more underlying software applications or operating systems are not configured to interpret the data in the first mode).

Continuing to Step 440, the system determines, using the interactive overlay application, whether a location of the detected input is within a particular distance of the one or more widgets but does not comprise the one or more widgets. In various embodiments, the particular distance comprises a particular physical distance (e.g., less than about 10 mm, between about 5 mm and 10 mm, less than about ¼ inch, or any other suitable distance). In other embodiments, the particular distance is a particular number of pixels. In various embodiments, the particular distance is based on a size and/or resolution of a display (e.g., a display screen) associated with the interactive display device. In particular embodiments, the system is configured to enable a user to set the particular distance (e.g., to adjust the particular distance by increasing or decreasing the particular distance). In still other embodiments, the particular distance may vary based on a type of widget the input is detected near. In still other embodiments, the system is configured to enable a user to adjust the particular distance based on type of widget. In yet other embodiments, the particular distance is a function of the device used to touch the screen (e.g., the user's finger, an electronic pen, etc.).

In various embodiments, the system determines whether the location of the detected input is within the particular distance based on a distance from the detected input location to the nearest point on the nearby widget (e.g., the nearest perpendicular distance, the Manhattan distance, etc.).

Returning to Step 450, the system, in response to determining that the location of the detected input is within the particular distance of the one or more widgets but does not comprise the one or more widgets, modifies the data related to the input such that a modified location of the detected input corresponds to an edge of the one or more widgets adjacent the location of the detected input. The system may, for example, interpret an input near an edge of a widget as being on the edge of the widget and modify the input location data accordingly to correspond to the edge of the widget. For example, the system may modify location data associated with the detected input (e.g., an x,y location) to correspond to a nearest edge of the adjacent widget. The system may modify the location based on the nearest edge that makes up part of the adjacent widget (e.g., based on Manhattan distance) in any suitable manner.

Continuing to Step 460, the system, in some embodiments, modifies the data related to the input comprising the modified location of the detected input to a second mode and transmits the modified data related to the input to the one or more underlying software applications in the second mode. In such embodiments, the system essentially transmits the modified location (e.g., the location on the edge of the widget rather than the actual, detected input adjacent the widget) to the underlying software application (e.g., or underlying operating system). In various embodiments, the system modifies the data to the second mode as discussed above. In some embodiments, the system modifies the location data and sends the modified data back to the input device with instructions to forward the modified data to the underlying software application, In various embodiments, the system is configured to substantially continuously (e.g., continuously) modify inputs to correspond to an edge of a widget (e.g., following an initial determination that a particular detected input was within a particular distance of a widget). In such embodiments, this may enable a user to use a widget (e.g., any suitable overlay tool) to trace the edge of the widget in an underlying software application (e.g., draw along the edge, write text along the edge, etc.). In various embodiments, the system is configured to perform the functions described herein for every input the system receives while the overlay application is running.

Although the above module is described in the context of an input, it should be understood by one skilled in the art that various embodiments of the system may be configured to detect simultaneous inputs (e.g., a plurality of substantially instantaneous (e.g., instantaneous inputs)). It should be further understood that in various embodiments, the system is configured to substantially continuously detect an input (e.g., or inputs) and process each particular detected input according to the module described herein. Although the module is described above as comprising various steps, it should be understood that particular other embodiments of such a module may incorporate additional steps, omit certain described steps, perform the described steps in an order other than in which they are presented, or otherwise modify the module in any other suitable manner.

Exemplary User Experience

FIGS. 5-11 depict screen displays that represent an exemplary user experience which a user may, in various embodiments encounter when using particular embodiments of the system (e.g., when using an interactive display device that includes the interactive overlay system).

Figure 5:
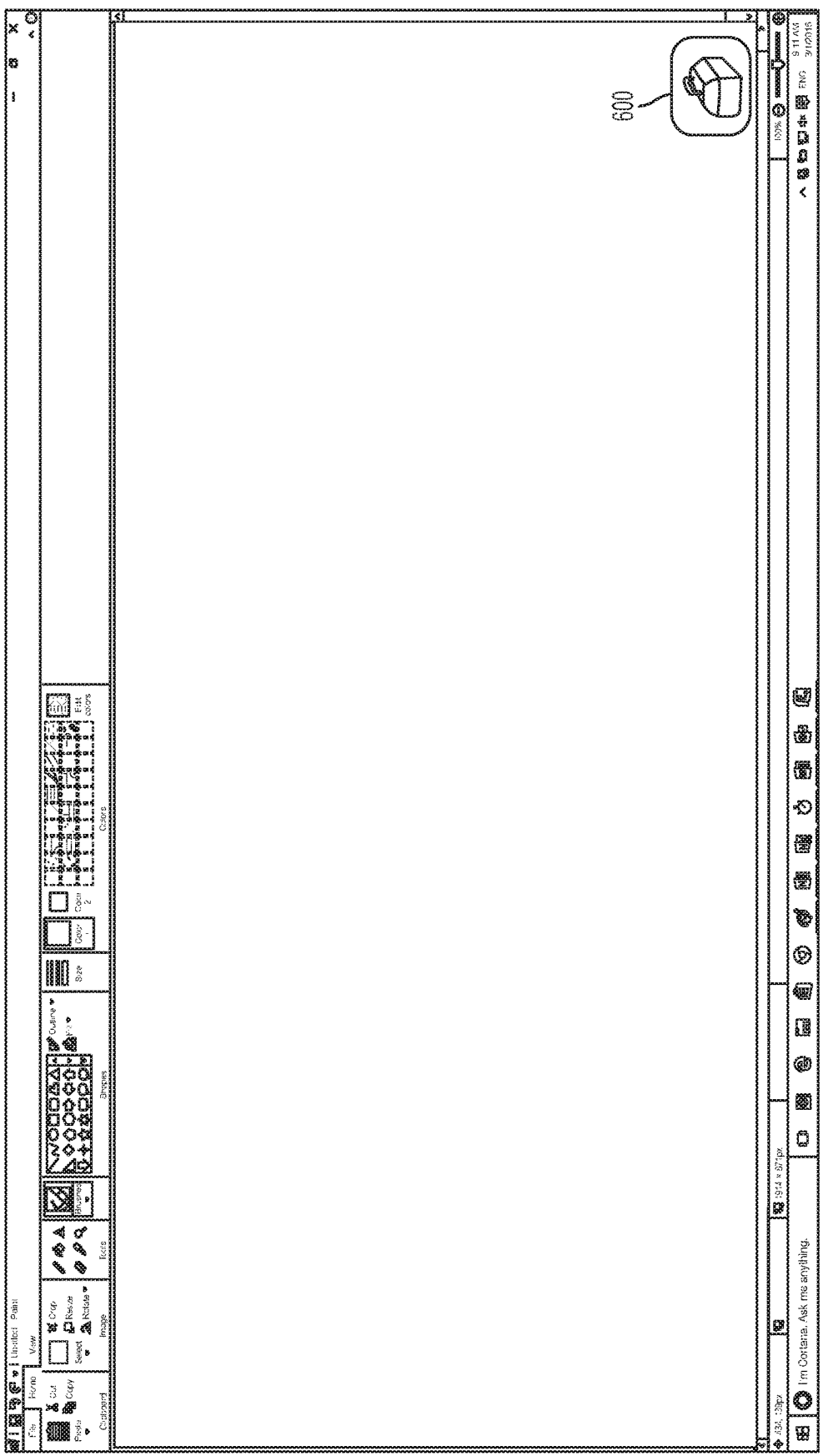
FIGS. 5-11 are screen displays which generally illustrate a user interface according to various embodiments of the interactive overlay system.

As may be understood from FIG. 5, a user interface 500 may include one or more underlying software applications (e.g., such as a drawing program such as Microsoft Paint as shown in the example shown in this figure) as well as a widget selection indicia 600 that makes up part of an interactive overlay application. As may be understood from this figure, the user interface 500 may include any suitable interface displayed on any suitable interactive display device (e.g., touchscreen device, or other suitable touchscreen device). As may be understood from this figure and this disclosure, the underlying software application, in the embodiment shown in this figure, does not include the widget selection indicia 600 that is part of the interactive overlay application that the system is substantially simultaneously displaying on the interactive display device.

Figure 6:
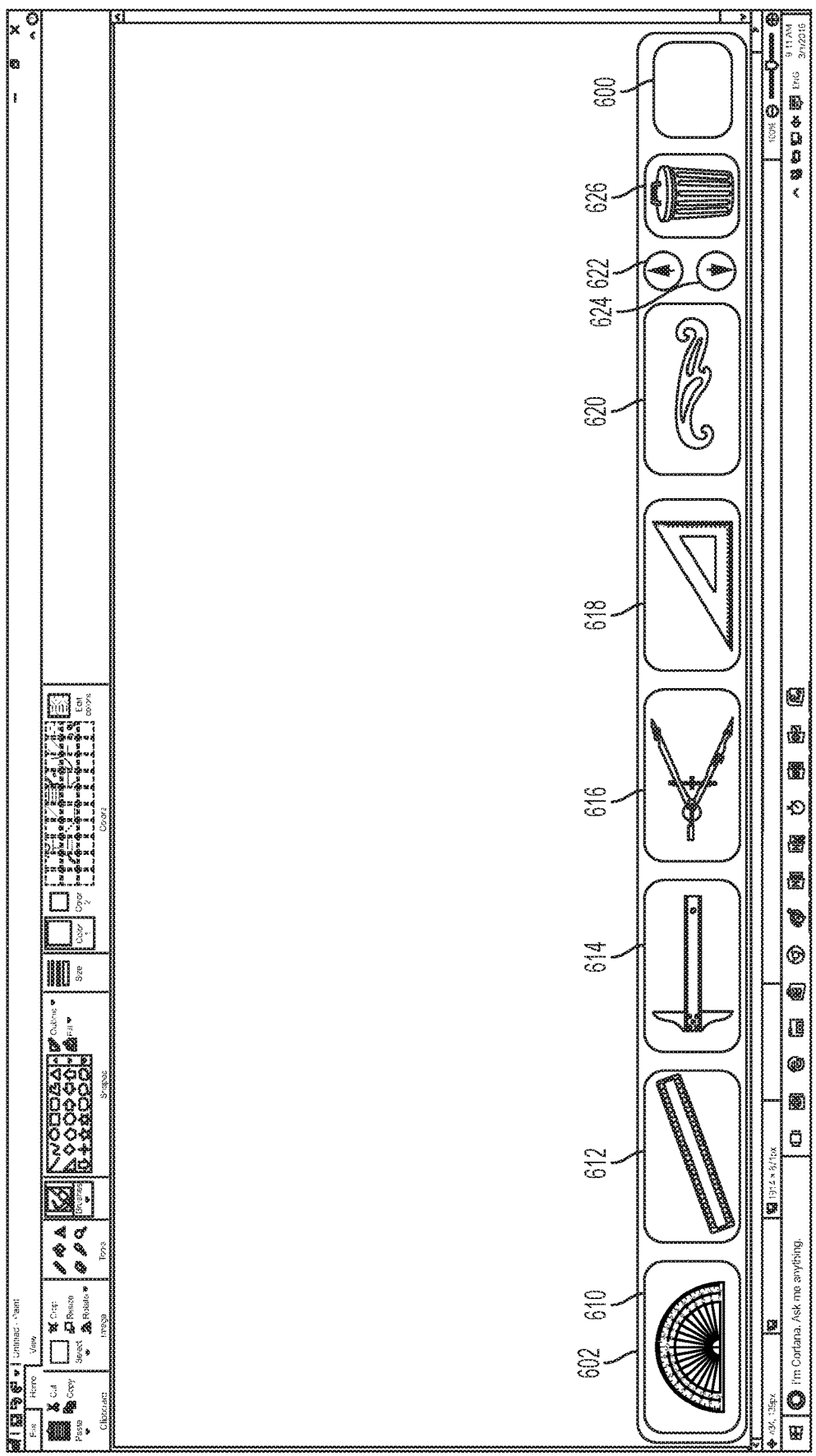

In the user interface 500 shown in this figure, a user may interact with the underlying software application normally (e.g., as the user would without the interactive overlay application running) in addition to interacting with the interactive overlay application (e.g., by selecting the widget selection indicia 600). As shown in FIG. 6, in response to selection, by the user, of the widget selection indicia 600, the system is configured to expand a widget selection toolbar 602, from which the user may select a particular widget 610, 612, 614, 616, 618, 620 for use with the underlying software application. In various embodiments, such as the embodiment shown in this exemplary user interface, a user may minimize (e.g., hide) the widget selection toolbar 602 by again selecting the widget selection indicia 600 (e.g., while the widget selection toolbar 602 is expanded).

In various embodiments, the widget selection toolbar 602 comprises a plurality of widgets 610, 612, 614, 616, 618, 620 such as, for example: (1) a protractor widget 610; (2) a ruler widget 612; (3) a T-square widget 614; (4) a compass widget 616; (5) a set square widget 618 (e.g., a triangle widget); and/or (6) a French curve widget 620. As may be understood by one skilled in the art, the plurality of widgets may include any other suitable widget, such as any other widget (e.g., or tool) described in this disclosure, or any other additional suitable widget which may be useful in the context of the system described herein. In various embodiments, the widget selection toolbar 602 further comprises: (1) scroll arrows 622, 624 which a user may, for example use to scroll among other available widgets; and (2) a trash can indicia 626, which a user may, for example, use to drag widgets that a user no longer wishes to use.

Figure 7:
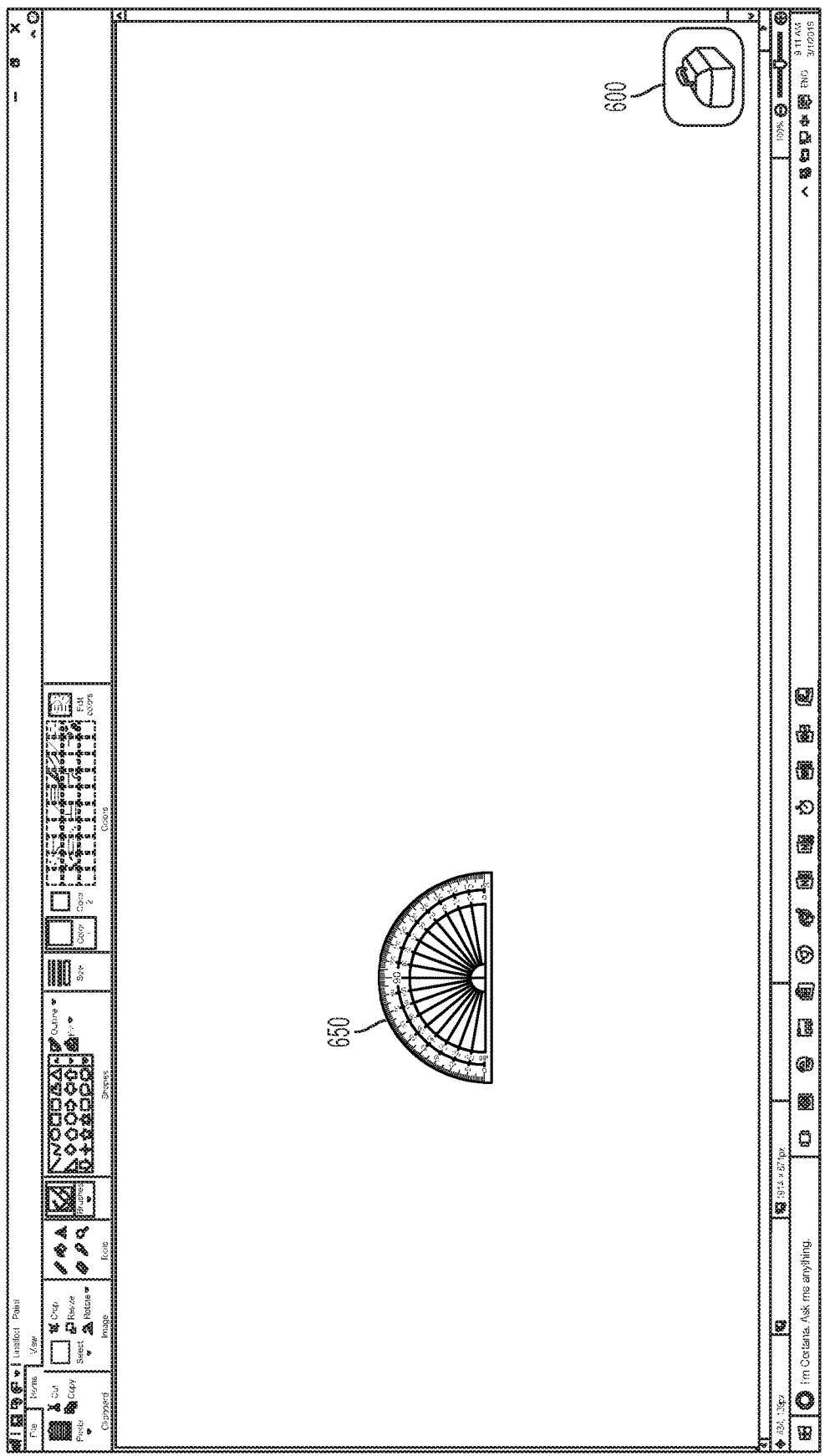

In particular embodiments, a user may select any of the plurality of widgets 610, 612, 614, 616, 618, 620 for use with the underlying software application by, for example: (1) selecting the particular desired widget; (2) dragging the particular desired widget out of the widget selection toolbar 602 (e.g., onto another portion of the user interface or display; (3) etc. The user may, for example, drag the protractor widget 610 from the widget selection toolbar 602 into the user interface 500 until a protractor widget tool 650 appears on the user interface 500 for use by the user as shown in FIG. 7. As may be understood by one skilled in the art, the protractor widget tool 650 shown in FIG. 7 is part of the interactive overlay application that is running over the underlying background software application that the system is also displaying on the user interface 500.

Figure 8:
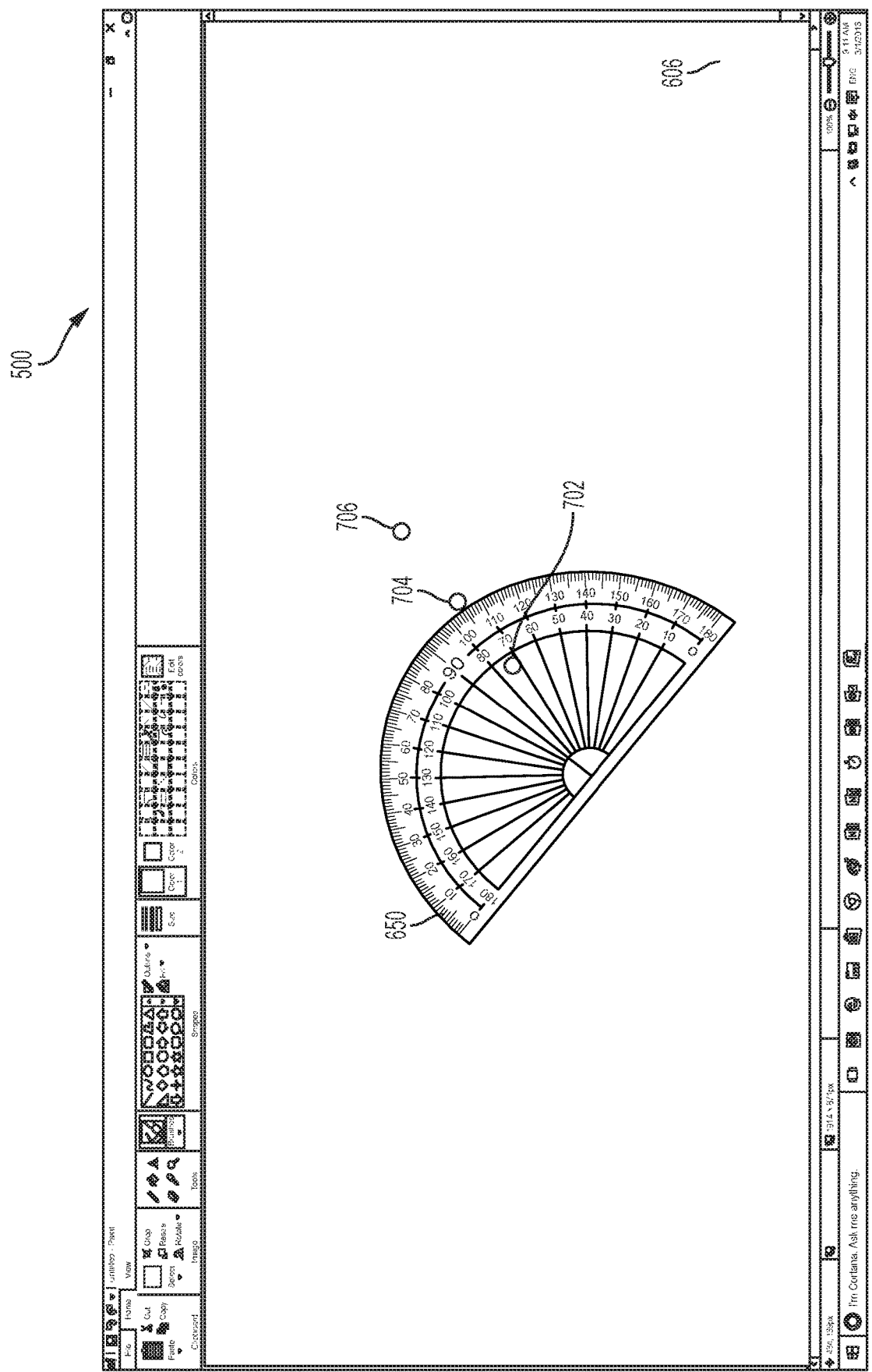

As shown in FIGS. 7 and 8, a user may interact with the protractor widget tool 650 by: (1) moving the protractor widget tool 650; (2) resizing the protractor widget tool 650; (3) rotating the protractor widget tool 650; or (4) adjusting a size, shape, orientation, etc. of the protractor widget tool 650 to any location or orientation desired by the user. In various embodiments, the user interactive overlay application is configured to enable the user to interact with the protractor widget tool 650 in any suitable way. As shown in FIGS. 7-8, the user has moved the protractor widget tool 650, rotated the protractor widget tool 650 clockwise to the right about forty-five degrees (e.g., about one eight of a turn), and increased the size of the protractor widget tool 650.

FIG. 8 depicts the protractor widget tool 650 in a position in which the user has placed the protractor widget tool 650 for use with the underlying software application. As may be understood from this figure, the system may be configured to detect input at any location on the user interface (e.g., at point 702, at point 704, at point 706, etc.). As shown in FIG. 8: (1) point 702 is located on the protractor widget tool 650 (e.g., located in a location on the user interface 500 that comprises the protractor widget tool 650); (2) point 704 is located off of the protractor widget tool 650 but in a location that is close to the protractor widget tool 650 (e.g., is a location within a particular short distance of the protractor widget tool 650 but that does not comprise the protractor widget tool 650); and (3) point 706 is located off of the protractor widget tool 650 (e.g., does not comprise the protractor widget tool 650).

The user may, for example, select a point 702 on the user interface that includes the protractor widget tool 650. In the embodiment shown in this figure, the system may, for example: (1) detect an input on the interactive display device at point 702; (2) transmit data related to the input (e.g., including the input point 702) to the interactive overlay application in a first mode (e.g., as a private event); (3) determine that the point 702 comprises the protractor widget tool 650; and (4) in response to determining that the point 702 comprises the protractor widget tool 650, modifying the protractor widget tool 650 based on the data related to the input. Modifying the protractor widget tool 650 may include, for example, selecting the protractor widget tool 650; moving the protractor widget tool 650; resizing the protractor widget tool 650; rotating the protractor widget tool 650; etc. In various embodiments, modifying the protractor widget tool 650 based on the input data may include modifying the protractor widget tool 650 based on a type of input (e.g., multi-touch, left click, right click, etc.) or any other suitable modification.

The user may alternatively, for example, select a point 706 on the user interface that does not include the protractor widget tool 650. In various embodiments, the system may, for example: (1) detect an input on the interactive display device at point 706; (2) transmit data related to the input (e.g., including the input point 706) to the interactive overlay application in a first mode (e.g., as a private event); (3) determine that the point 706 does not comprise the protractor widget tool 650; and (4) in response to determining that the point 706 does not comprise the protractor widget tool 650: (a) modifying the data to a second mode (e.g., to a native event); and (b) transmitting the data to the underlying software application in the second mode (e.g., by sending the modified data to the input device with instructions to forward the modified data to the underlying software program).

The user may also, for example, select a point 704 on the user interface that does not include the protractor widget tool 650 but is in a location that is close to the protractor widget tool 650 (e.g., is within a particular distance of the protractor widget tool 650). In various embodiments, the interactive overlay application is configured to determine that a point 704 is close if it is within a particular distance of the protractor widget tool 650 (e.g., within a certain number of pixels, within a certain distance, etc.) The system may, for example: (1) detect an input on the interactive display device at point 704; (2) transmit data related to the input (e.g., including the input point 704) to the interactive overlay application in a first mode (e.g., as a private event); and (3) determine that the point 704 is within a particular distance of the protractor widget tool 650 but does not comprise the protractor widget tool 650.

Figure 9:
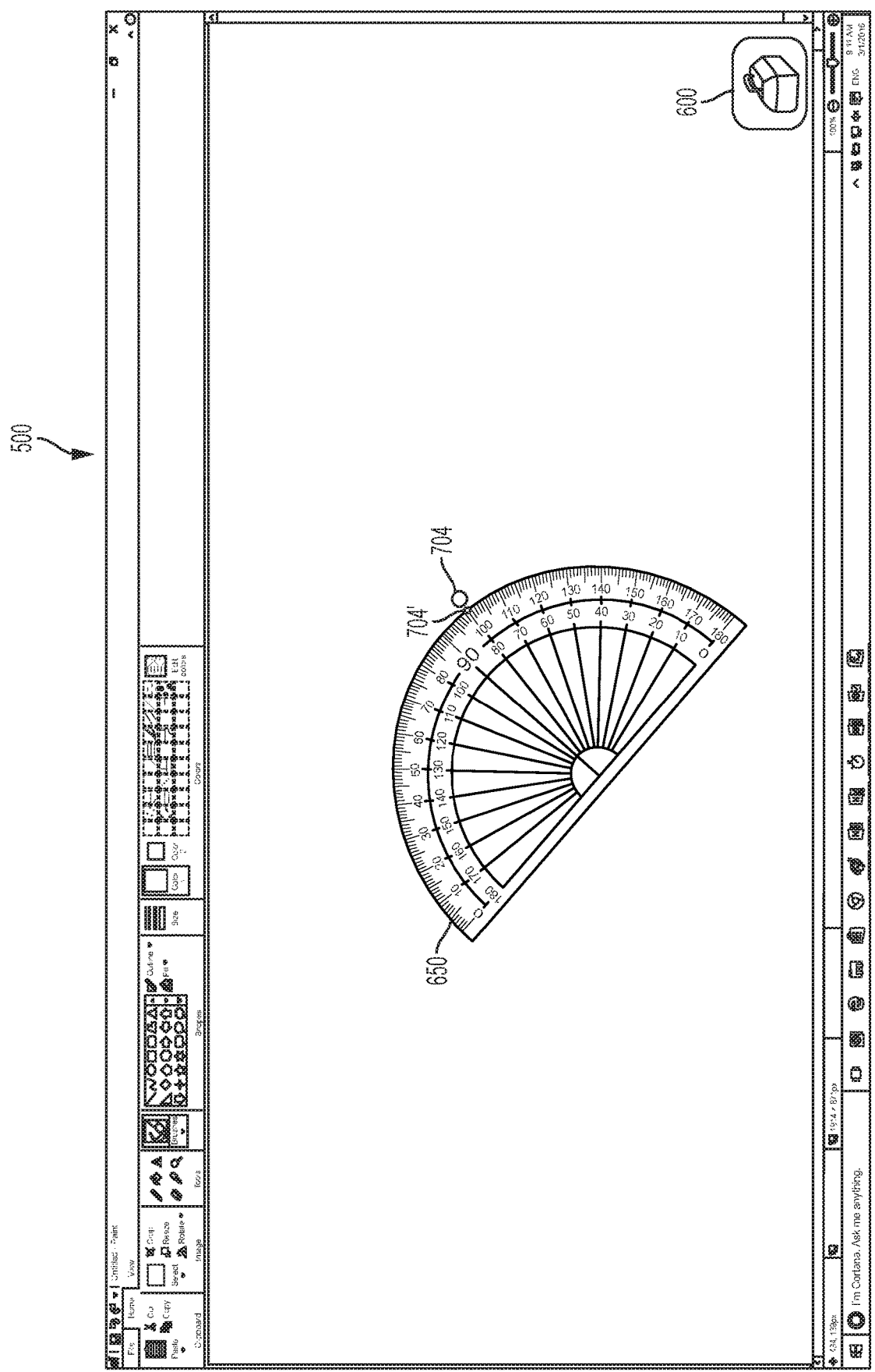

Continuing to FIG. 9, the system may, in response to determining that the location of the detected input (e.g., the point 704) is within the particular distance of the protractor widget tool 650 but does not comprise the protractor widget tool, modify the point 704 to a modified point 704' that corresponds to an edge of the protractor widget tool 650 that is adjacent the point 704. The system then, in various embodiments, modifies the data related to the input to comprise the modified point 704' and transmits the modified data to the underlying software application in the second mode. In various embodiments, the underlying software application is configured to receive the modified input data and respond as the underlying software application would respond to any other input. For example, the underlying software application would, in a particular example in which the underlying software application is a drawing application, apply a drawing at the modified point 704' (e.g., place a mark at the modified point 704').

As may be understood from this figure, the system is configured such that the underlying software application only receives an input at the modified point 704'—the interactive overlay application receives the point 704 of actual input by the user, acts as a gatekeeper (e.g., a filter) and modifies the point 704 to a modified point 704' to correspond to the edge of the protractor widget tool 650 prior to passing data including the modified point 704' on to the underlying software application.

Figure 10:
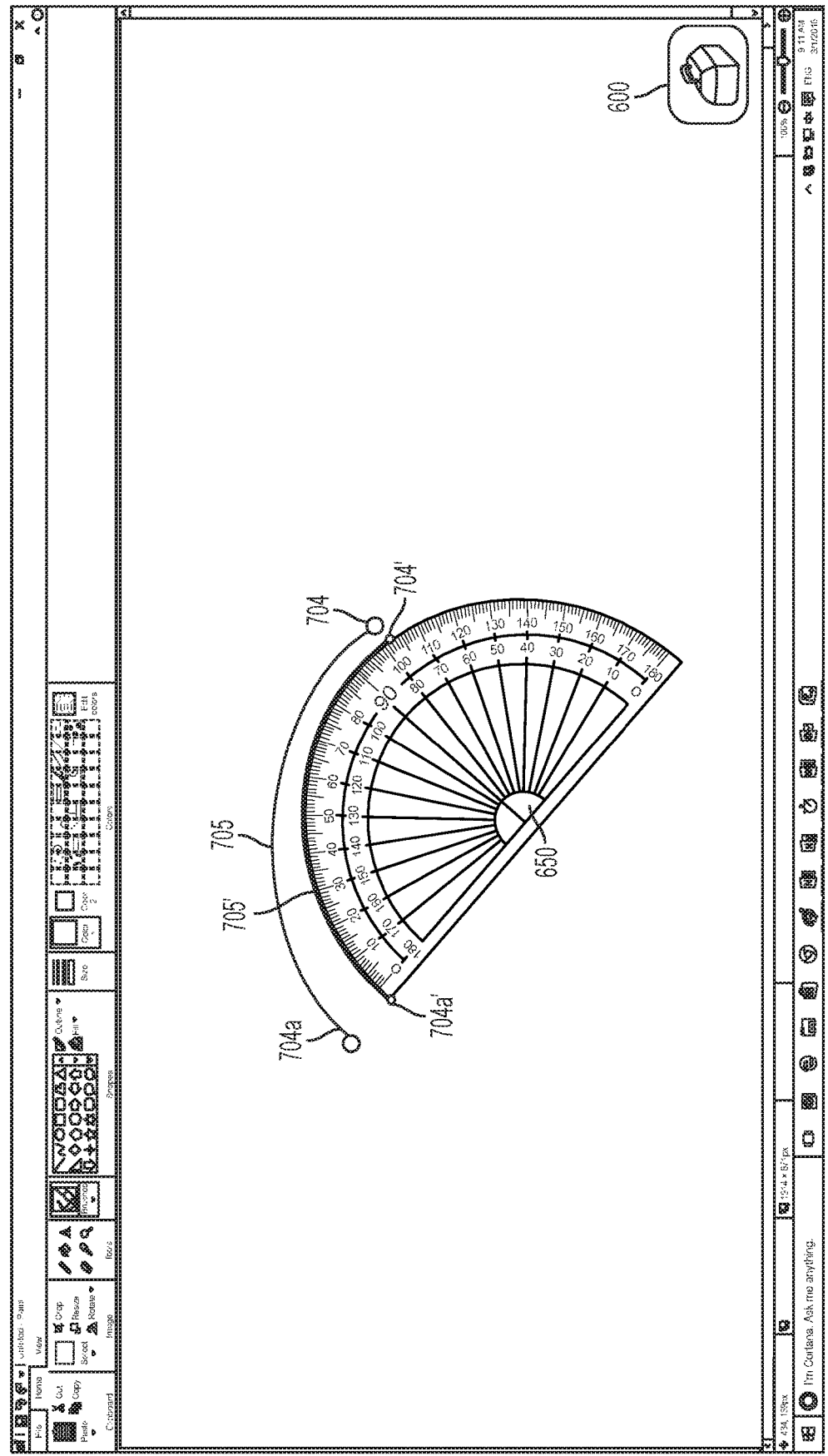

In various embodiments, the system is configured to substantially continuously perform the above point modification subsequent to detecting an initial input that is within the particular distance of the protractor widget tool 650 but does not comprise the protractor widget tool. FIG. 10 depicts a modified curve 705' that the underlying software application (e.g., drawing application) produces in response to a particular user input curve 705 (e.g., free-hand curve).

Regarding FIG. 10, as discussed above, in various embodiments, the interactive overlay application is configured to determine that a point 704 is close if it is within a particular distance of the protractor widget tool 650 (e.g., within a certain number of pixels, within a certain distance, etc.) The system may, for example: (1) detect an input on the interactive display device at point 704; (2) transmit data related to the input (e.g., including the input point 704) to the interactive overlay application in a first mode (e.g., as a private event); (3) determine that the point 704 is within a particular distance of the protractor widget tool 650 but does not comprise the protractor widget tool 650; (4) in response to determining that the location of the detected input (e.g., the point 704) is within the particular distance of the protractor widget tool 650 but does not comprise the protractor widget tool, modify the point 704 to a modified point 704' that corresponds to an edge of the protractor widget tool 650 that is adjacent the point 704; and (5) modify the data related to the input to comprise the modified point 704' and transmits the modified data to the underlying software application in the second mode.

Figure 11:
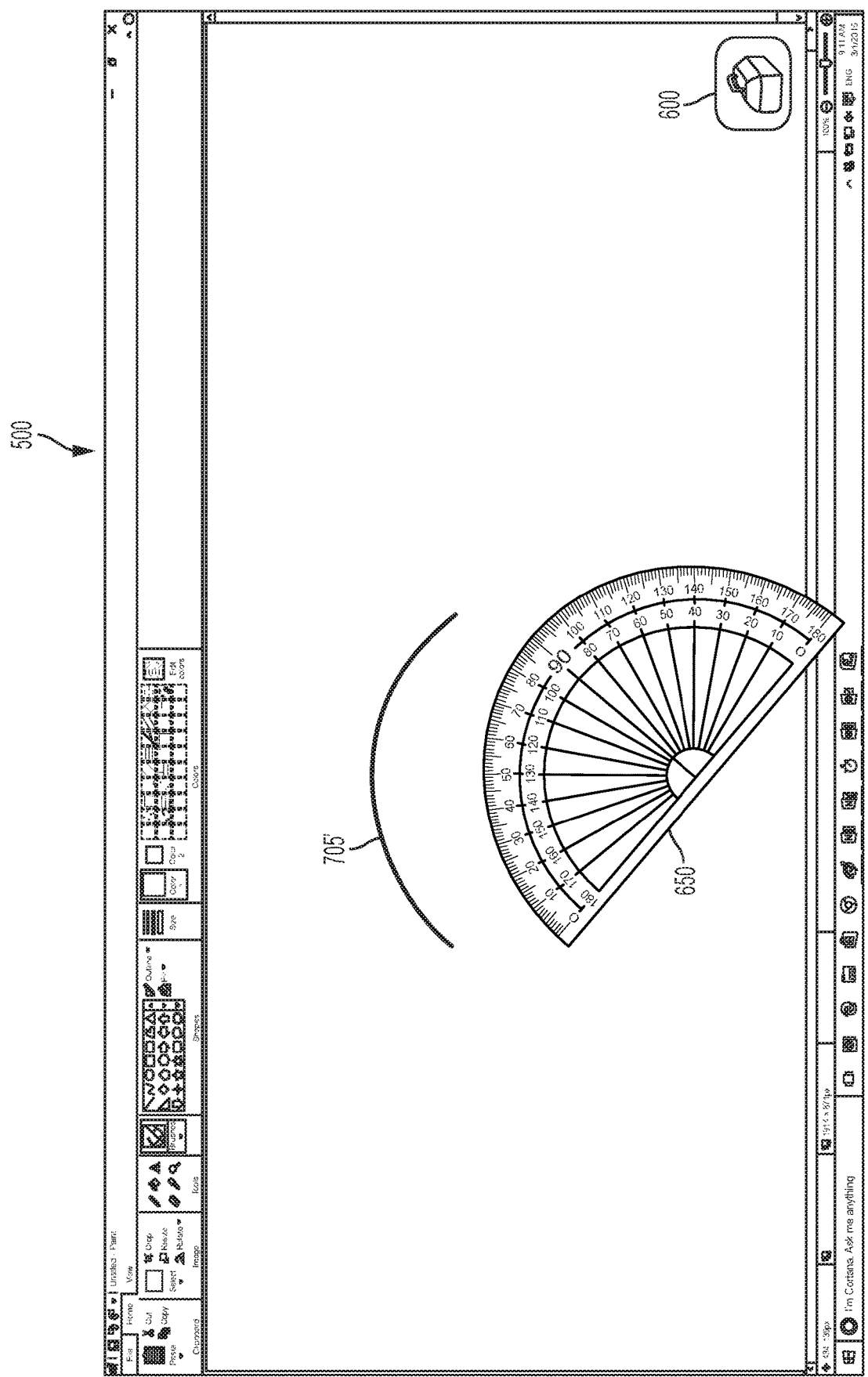

In response to the user continuing input following the initial input (e.g., at point 704), for example, by dragging their finger along user input curve 705 to point 704a on a touchscreen display, the system is configured to substantially continuously (e.g., continuously) modify every input point along input curve 705 such that the system converts a plurality of input points along input curve 705 to correspond to the edge of the protractor widget tool 650. As shown in FIG. 10, the resultant modified curve 705' (e.g., curved line drawn by the underlying software drawing application) comprises a plurality of modified points. As should be understood in light of this figure, the system (e.g., the interactive overlay application) is configured to modify the user input (e.g., at the overlay layer prior to passing the modified input through to the underlying software application) to follow the edge of the curve of the protractor widget tool 650 to form the modified curve 705' regardless of any deviation by the user in: (1) distance of actual input from the protractor widget tool 650; (2) smoothness of input following initial input at point 704; and/or (3) etc. In various embodiments, the system is configured to follow the curve (e.g., the shape of the widget) by modifying the user's actual input to follow the edge of the widget based on: (1) a direction of input by the user following an initial input within the particular distance of the widget (e.g., which way the user drags their finger or fingers); (2) a length of input by the user following an initial input within the particular distance of the widget (e.g., how far the user drags their finger or fingers or for how long); etc. FIG. 11 depicts the resultant modified curve 705' on the underlying software application (e.g., drawings application) after the user has moved the protractor widget tool 650 following drawing of the resultant modified curve 705'.

Although the above example of continuous modification is described in the context of continuous modification following initial input, it should be understood that the system may be configured to trace the curve (e.g., follow the edge) of a particular widget in any other suitable manner. The system may, for example, detect an input within a particular distance of the widget and: (1) modify a particular number of subsequent detected inputs to correspond to an edge of the widget (e.g., the next two inputs, three inputs, four inputs, ten inputs, or any other suitable number of inputs); (2) modify a subsequent continuous input following an initial static input within the particular distance of the widget; and/or (3) modify any other suitable manner of input by the user to correspond to an edge of any suitable widget (e.g., or widgets).

Although the above user experience is described in the context of a protractor widget tool 650, it should be understood that the interactive overlay system may be utilized with other suitable widgets in other embodiments, such as any widget described in this document or any other suitable widget. For example, a user may an experience similar to the above-described user experience using, for example: (1) a protractor widget 610; (2) a ruler widget 612; (3) a T-square widget 614; (4) a compass widget 616; (5) a set square widget 618 (e.g., a triangle widget); and/or (6) a French curve widget 620 shown in FIG. 6.

Alternative Embodiments

Various embodiments of an interactive overlay system may include features in addition to those described above. Various exemplary alternative embodiments are described below.

In various embodiments, the system is configured to, for every input detected on an interactive display device, determine whether the input is: (1) on a widget that is part of an overlay application; (2) off any widget that is part of an overlay application; or (3) within a particular distance of a widget but also off any widget that is part of an overlay application. In particular embodiments, the system is then configured, for every detected input, to take a suitable action based on the determined location of the input at the overlay level (e.g., such as any suitable location based on the location discussed herein).

In particular embodiments the system is configured to enable multiple users to interact with (e.g., use) multiple widgets substantially simultaneously on a single interactive display. In such embodiments, the system may enable multiple active tools (e.g., multiple protractors) on a single overlay layer. In other embodiments, the system may be configured to run a plurality of overlay applications substantially simultaneously (e.g., simultaneously). In such embodiments, the system may pass any input on any particular overlay layer through to an ultimate, underlying software application after determining that the input was not intended for that particular overlay layer. In such embodiments, the system may alternatively pass any inputs determined to no be for a particular overlay layer on to the next overlay layer immediately behind the particular overlay layer.

In various embodiments, the system is configured to break a particular interactive display device into a sub-coordinate system (e.g., into a plurality of work areas such as four quadrants). In such embodiments, the system may be configured to enable distinct individuals to interact with the interactive display device and use one or more widgets as part of the overlay on each distinct portion of the display (e.g., in each of their respective quadrants). In such embodiments, the main overlay application is assigned a global coordinate system and each quadrant is assigned a quadrant coordinate system such that an input is translated from the global coordinate system into the respective quadrant coordinate system, In this way, a single overlay application can track and allow multiple users to simultaneously use the same interactive overlay application.

Conclusion

Many modifications and other embodiments of the invention will come to mind to one skilled in the art to which this invention pertains having the benefit of the teachings presented in the foregoing descriptions and the associated drawings. For example, the interactive overlay application may be utilized with any suitable underlying software application, operating system, or other application, user interface, etc. The interactive overlay system may be utilized in any suitable context (e.g., such as a classroom, by an individual such as an artist, etc.) using any suitable device (e.g., an interactive display such as an interactive projector, touchscreen device, etc.) Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. An interactive overlay system comprising:
   one or more processors;
   a computing device operatively coupled to the one or more processors, the computing device comprising a display screen; and
   an input device, wherein the interactive overlay system is configured for:
      providing an interactive overlay application for use with the computing device, the interactive overlay application being configured to run with an underlying software application in the background on the computing device while the computing device is displaying the underlying software application on the display screen and further configured to cause the computing device to report inputs from the input device by transmitting packets according to a first protocol that the underlying software application is not configured to interpret;
      receiving an input on the computing device from the input device;
      determining input data related to the input, the input data comprising at least a location of the input;
      transmitting the input data to the interactive overlay application according to a first protocol;
      determining, using the interactive overlay application, whether the location of the input comprises a location intended for the underlying software application;
      in response to determining that the location of the input comprises a location intended for the underlying software application;
      modifying the input data based on a second protocol to second input data;
      transmitting the second input data to the underlying software application;
      modifying an open document in the underlying software application based at least in part on the second input data; and
      storing the open document in computer memory.

2. The interactive overlay system of claim 1, wherein:
   the interactive overlay system is configured to display the interactive overlay application over at least a portion of the display screen; and
   the interactive overlay system is further configured for:
      determining using the interactive overlay application, whether the location of the input does not comprise the at least a portion of the display screen displaying the interactive overlay application; and
      in response to determining that the location of the input does not comprise the at least a portion of the display screen displaying the interactive overlay application, determining that the location of the input comprises the location intended for the underlying software application.

3. The interactive overlay system of claim 1, wherein:
   the input data comprising at least a type of the input; and
   modifying the open document in the underlying software application based at least in part on the second input data comprises modifying the open document based on the type of the input.

4. The interactive overlay system of claim 1, wherein:
   the interactive overlay application comprises one or more widgets; and
   the computing device is configured to display the one or more widgets on the display screen over at least a portion of the underlying software application while the computing device is displaying the underlying software application on the display screen.

5. The interactive overlay system of claim 4, wherein the interactive overlay system is further configured for:
   determining, using the interactive overlay application, whether the location of the input comprises the one or more widgets; and
   in response to determining that the location of the input comprises the one or more widgets, modifying the one or more widgets based on the input data.

6. The interactive overlay system of claim 5, wherein the interactive overlay system is further configured for:
 determining, by the interactive overlay application, whether the location of the input is within a particular distance of the one or more widgets but does not comprise the one or more widgets; and
 in response to determining that the location of the input is within the particular distance of the one or more widgets but does not comprise the one or more widgets:
  modifying the input location to a modified input location that corresponds to an edge of the one or more widgets most adjacent the input location;
  modifying the input data to include the modified input location based on the second protocol to generate modified formatted input data;
  transmitting the modified formatted input data to the underlying software application, such that the underlying software application receives the modified input location rather than the input location; and
  modifying the open document in the underlying software application based at least in part on the modified formatted input data.

7. The interactive overlay system of claim 6, wherein:
 the input is an initial input;
 the initial input is within the particular distance of the one or more widgets but does not comprise the one or more widgets; and
 the interactive overlay system is further configured for:
  detecting a plurality of continuous inputs following the initial input; and
  for each respective continuous input:
   modifying a location of each respective continuous input to correspond to an edge of the one or more widgets most adjacent the location of each respective continuous input based on the second protocol to generate a plurality of modified continuous input locations;
   transmitting each of the plurality of modified continuous input locations to the underlying software application; and
   modifying the underlying software application based at least in part on each of the plurality of modified continuous input locations.

8. The interactive overlay system of claim 1, wherein modifying the open document based at least in part on the second input data comprises placing a mark in the open document on the underlying software application at the location of the input.

9. A computer-implemented data-processing method for gatekeeping detected inputs on an interactive display device, the method comprising:
 causing, by one or more processors, the interactive display device to run an interactive overlay application configured to run with an underlying software application in the background on the interactive display device, wherein the interactive overlay application is configured to report inputs detected at the interactive display device in a first mode that the underlying software application is not configured to interpret;
 detecting, by one or more processors, an input on the interactive display device;
 in response to detecting the input, transmitting, by one or more processors, data related to the input to the interactive overlay application in the first mode;
 determining, by one or more processors, based on the data related to the input, using the interactive overlay application, whether the input was intended for the underlying software application;
 in response to determining that the input was intended for the underlying software application;
  modifying, by the interactive overlay application, the data related to the input from the first mode to a second mode; and
  transmitting, by one or more processors, the data related to the input to the underlying software application in the second mode; and
 in response to transmitting the data related to the input to the underlying software application, taking a first action, by one or more processors, in the underlying software application based at least in part on the data related to the input.

10. The computer-implemented data-processing method of claim 9, wherein the data related to the input comprises a location of the input.

11. The computer-implemented data-processing method of claim 9, wherein taking the first action in the underlying software application based at least in part on the data related to the input comprises modifying an open document on the underlying software application at the location of the input.

12. The computer-implemented data-processing method of claim 10, wherein:
 the interactive overlay application is configured to interpret input data in the first mode;
 the underlying software application is configured to interpret input data in the second mode but not in the first mode.

13. The computer-implemented data-processing method of claim 9, wherein:
 the data related to the input comprises the location of the input;
 the interactive overlay application comprises one or more widgets; and
 the method further comprises:
  determining, by one or more processors, based on the data related to the input, using the interactive overlay application, whether location of the input comprises the one or more widgets;
  in response to determining that the location of the input comprises the one or more widgets, modifying the one or more widgets based on the input data.

14. The computer-implemented data-processing method of claim 13, the method further comprising:
 determining, by one or more processors, using the interactive overlay application, whether the location of the input is within a particular distance of the one or more widgets but does not comprise the one or more widgets; and
 in response to determining that the location of the input is within the particular distance of the one or more widgets but does not comprise the one or more widgets:
  modifying the location of the input to a modified input location that corresponds to an edge of the one or more widgets most adjacent the location of the input;
  modifying the data related to the input to include the modified input location to generate modified input data;
  transmitting the modified input data to the underlying software application, such that the underlying software application receives the modified input location rather than the location of the input; and taking a second action in the underlying software application based at least in part on the modified input data.

15. The computer-implemented data-processing method of claim 9, wherein the underlying software application is selected from a group consisting of:
    a drawing application;
    a presentation application;
    a word processing application;
    a teaching application; and
    an architectural drafting application.

16. An interactive display system comprising:
    one or more processors;
    computer memory; and
    an interactive display device operatively coupled to the one or more processors, wherein the interactive display system is configured for:
      providing an interactive overlay application for use with the interactive display device, the interactive overlay application being configured to run with one or more underlying software applications in the background on the interactive display system and further configured to cause the interactive display device to transmit input data for inputs detected on the interactive display device using private packets that the one or more underlying software applications are not configured to interpret;
      detecting an input on the interactive display device;
      determining the input data related to the input, the input data comprising at least a location of the input;
      transmitting a first packet comprising the input data to the interactive overlay application, the first packet comprising a private packet;
      determining, using the interactive overlay application, whether the location of the input comprises a particular one of the one or more underlying software applications;
      in response to determining that the location of the input comprises the particular one of the one or more underlying software applications:
        modifying, by the interactive overlay application, the first packet to a second packet, the second packet comprising a first standard packet;
        transmitting the second packet to the particular one of the one or more underlying software applications;
        modifying an open document in the particular one of the one or more underlying software applications based at least in part on the second packet; and
        storing the open document in the computer memory.

17. The interactive display system of claim 16, wherein:
    the interactive overlay application comprises one or more widgets; and
    the interactive display system is further configured for:
      determining, using the interactive overlay application, whether the location of the input comprises one widget of the one of the one or more widgets on the interactive display device; and
      in response to determining that the location of the input comprises the one widget of the one or more widgets, modifying the one widget based on the first packet.

18. The interactive display system of claim 17, wherein the interactive display system is further configured for:
    determining, using the interactive overlay application, whether the location of the input is within a particular distance of the one widget of the one or more widgets but does not comprise the one widget; and
    in response to determining that the location of the input is within the particular distance of the one widget and the location of the input does not comprise the one widget:
      modifying the input location to a modified input location that corresponds to an edge of the one widget adjacent the input location;
      modifying the first packet to a third packet comprising the modified input location, the third packet comprising a second standard packet;
      transmitting the third packet to the one or more underlying software applications;
      modifying the open document in the particular one of the one or more underlying software applications based at least in part on the second packet; and
      storing the open document in the computer memory.

\* \* \* \* \*

UNITED STATES PATENT AND TRADEMARK OFFICE
CERTIFICATE OF CORRECTION

PATENT NO. : 11,182,067 B2
APPLICATION NO. : 16/746380
DATED : November 23, 2021
INVENTOR(S) : Paul Wareing et al.

Page 1 of 1

It is certified that error appears in the above-identified patent and that said Letters Patent is hereby corrected as shown below:

In the Claims

At Claim 12, Line 27, "of claim 10, wherein:" should read --of claim 9, wherein:--.

Signed and Sealed this
Twenty-fourth Day of January, 2023

Katherine Kelly Vidal
*Director of the United States Patent and Trademark Office*